UNITED STATES PATENT OFFICE.

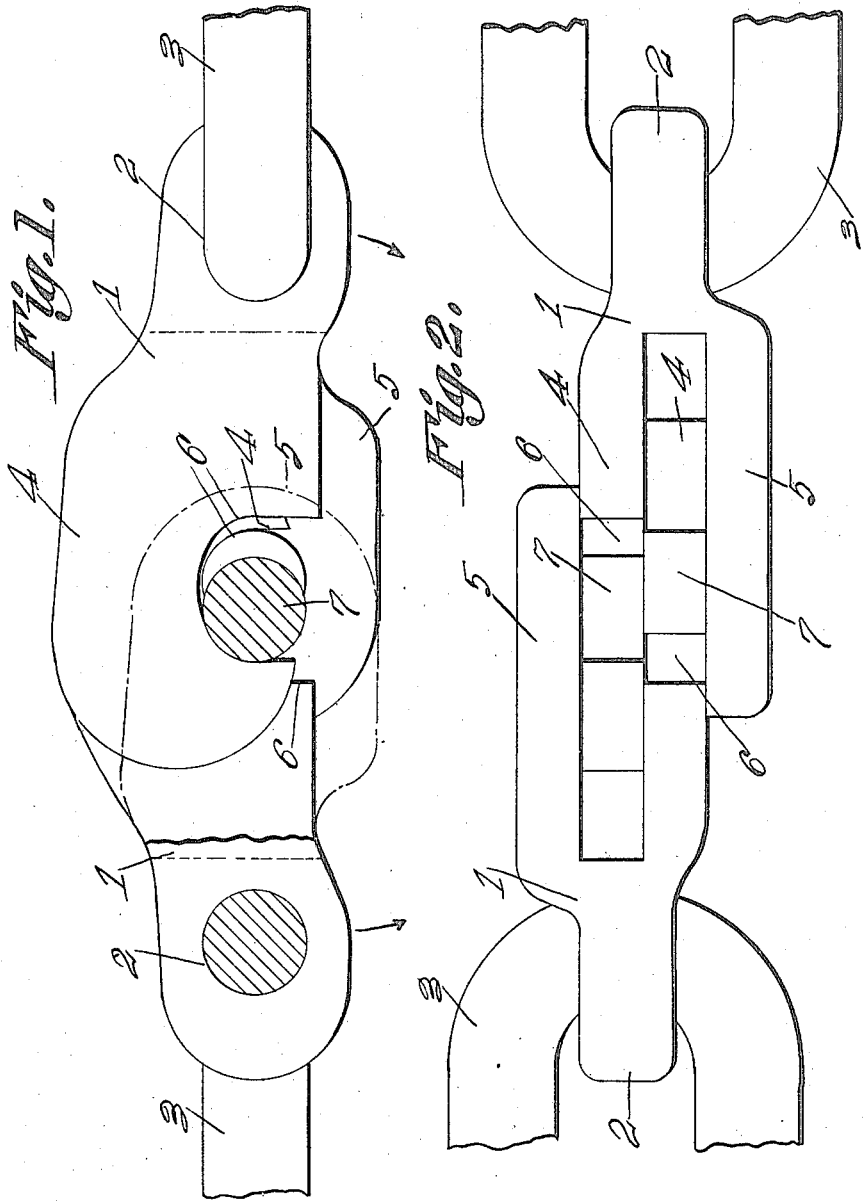

HARRY L. LOWE, OF CLINTON, INDIANA, ASSIGNOR TO CLINTON SWITCH COMPANY, OF CLINTON, INDIANA.

CAR-COUPLING.

1,240,066.  Specification of Letters Patent.  Patented Sept. 11, 1917.

Application filed October 26, 1916. Serial No. 127,881.

*To all whom it may concern:*

Be it known that I, HARRY L. LOWE, a citizen of the United States, residing at Clinton, in the county of Vermilion and State of Indiana, have invented a new and useful Car-Coupling, of which the following is a specification.

The present invention appertains to car couplings, and aims to provide a novel and improved coupling adapted especially for hitching mine cars together, but useful for other similar purposes.

It is the object of the invention to provide a coupling composed of two members or parts, preferably duplicates of one another, which are provided with novel interengageable means whereby the parts can be readily assembled and separated when they are brought at an abnormal position relative to one another, whereby when said members are assembled and moved toward a straight line position, they are locked together against accidental separation, the device being extremely simple and inexpensive in construction, as well as being thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the coupling, a portion being broken away and illustrated in dot and dash lines.

Fig. 2 is a side elevation of the coupling.

The coupling is composed of two members or parts 1 which are of duplicate construction, and which can be readily cast or otherwise formed from suitable metal, each being composed of one integral casting or part.

Each member 1 is provided with an eye 2 or other suitable portion for the engagement of a chain link 3 or other means for connecting the member to the mine car or other object to be coupled to another one. Each member 1 is bifurcated to provide the spaced ears 4 and 5 in parallel planes. The ear 4 of each member 1 is adapted to fit snugly between the ears of the other member, as clearly seen in Fig. 2, with the ears 5 remote from one another. The ear 4 of each member 1 is provided with a recess 6 opening toward one side, and the ear 5 of each member has a stud 7 projecting from its inner surface across the slot between the ears toward and within the outline of the respective recess 6, but terminating short of the respective ear 4.

In assembling the two members, they are disposed side by side with the eyes 2 adjacent one another and with the open ends or mouths of the recesses 6 confronting one another. The two members can then be moved transversely of themselves toward one another to bring the ear 4 of each member between the ears of the other member, the studs 7 moving into the recesses of the opposite members. Then, by swinging the two members into alinement or toward a straight line position, as seen in Fig. 1, they are locked together against accidental detachment. In this position, the recesses 6 both open toward the same side, as seen in Fig. 1, and the studs 7 being disposed within the recesses prevents the longitudinal separation of the members, as well as preventing the lateral separation thereof. If the right hand member in Fig. 1 is moved away from the observer, the lower stud 7 carried by said member will strike the ear 4 of the left hand member 1, and if the members are moved in the opposite direction, the ear 4 of the right hand member 1 will strike the stud 7 of the left hand member 1, thereby preventing the lateral separation of said members. As a result, the members although loosely connected with one another, cannot separate accidentally, but they can move relative to one another. To separate the members, this can be readily accomplished by swinging them in the direction of the arrows in Fig. 1, whereby the recesses 6 are reversed, so that the studs 7 can move out of them.

The attachment and separation of the two parts or members can be readily accomplished, but when they are assembled they are not apt to become detached accidentally although they may swing and vibrate relative to one another. The construction is exceedingly simple, and the members 1 can be manufactured at a small cost.

Having thus described the invention, what is claimed as new is:

1. A bifurcated coupling member to receive a portion of a duplicate companion coupling member and having a laterally opening recess in one portion and a stud projecting from the other to enter the recess of the companion coupling member.

2. A bifurcated coupling member having a pair of spaced ears to receive an ear of a similar companion coupling member, one ear having a laterally opening recess, the other ear having a stud projecting therefrom toward said recess to enter the recess of the companion coupling member.

3. A coupling embodying a pair of similar members each having a laterally opening recess and a stud to enter the recess of the other member, said recesses facing one another when the members are arranged side by side and facing in the same direction when said members are moved toward a straight line position.

4. A coupling embodying a pair of members each being bifurcated to provide a pair of spaced portions, one portion of each member having a laterally opening recess and the other portion having a stud to enter the recess of the other member, said recesses facing one another when the members are arranged side by side and facing in the same direction when said members are moved toward a straight line position.

5. A coupling embodying a pair of bifurcated members each having a pair of spaced ears, one ear of each member having a laterally opening recess and the other ear having a stud projecting toward said recess, said recesses facing one another when the members are arranged side by side and facing in the same direction when said members are moved toward a straight line position.

In testimony that I claim the foregoing as my own, I have hereto affixed my signature in the presence of two witnesses.

HARRY L. LOWE.

Witnesses:
 ROY SLATER,
 JOHN F. ADAMS.

Copies of this patent may be obtained for five cents each, by addressing the "Commissioner of Patents, Washington, D. C."